United States Patent
Nakagawa (10) Patent No.: US 11,032,191 B2
(45) Date of Patent: Jun. 8, 2021

(54) ON-BOARD COMMUNICATION SYSTEM AND METHOD FOR CONTROLLING ON-BOARD COMMUNICATION SYSTEM

(71) Applicant: TOYOTA JIDOSHA KABUSHIKI KAISHA, Toyota (JP)

(72) Inventor: Masashi Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 15/851,042

(22) Filed: Dec. 21, 2017

(65) Prior Publication Data

US 2018/0183710 A1    Jun. 28, 2018

(30) Foreign Application Priority Data

Dec. 26, 2016   (JP) .............................. JP2016-251970

(51) Int. Cl.
*H04L 12/717* (2013.01)
*H04L 29/08* (2006.01)
*H04L 12/40* (2006.01)

(52) U.S. Cl.
CPC .............. *H04L 45/42* (2013.01); *H04L 67/12* (2013.01); *H04L 12/40* (2013.01); *H04L 12/40143* (2013.01); *H04L 2012/40215* (2013.01)

(58) Field of Classification Search
CPC ......... H04L 67/12; H04L 45/42; H04L 12/40; H04L 12/40143; H04L 2012/40215
See application file for complete search history.

(56) References Cited

U.S. PATENT DOCUMENTS

| | | | |
|---|---|---|---|
| 7,319,848 B2 | 1/2008 | Obradovich et al. | |
| 8,909,726 B1 * | 12/2014 | Eckert | H04L 45/74 709/207 |
| 2003/0009271 A1 * | 1/2003 | Akiyama | G06F 21/335 701/29.6 |
| 2004/0088087 A1 * | 5/2004 | Fukushima | B60R 16/0231 701/29.6 |
| 2012/0084482 A1 * | 4/2012 | Yamanaka | G06F 13/385 710/305 |
| 2013/0067088 A1 * | 3/2013 | Kern | H04L 63/0407 709/226 |
| 2014/0036693 A1 * | 2/2014 | Mabuchi | H04L 43/0817 370/243 |
| 2016/0234037 A1 * | 8/2016 | Mabuchi | H04L 12/40182 |
| 2016/0352533 A1 * | 12/2016 | Talty | H04L 12/4015 |
| 2018/0152341 A1 * | 5/2018 | Maeda | B60R 16/02 |

* cited by examiner

*Primary Examiner* — Jason D Recek
(74) *Attorney, Agent, or Firm* — Hunton Andrews Kurth LLP (57) ABSTRACT

An on-board communication system includes an on-board communication device and on-board devices. Each of the on-board devices includes a communication device controller configured to control data communication performed between the on-board communication device and a server and a priority setting portion configured to set priority ranks of the on-board devices for controlling the on-board communication device. When each of the on-board devices performs data communication with the server and if any one of the on-board devices is set to a higher priority rank, the on-board device is configured to transmit communication data to the on-board device that is set to a higher priority rank to perform data communication with the server via the on-board device that is set to a higher priority rank and the on-board communication device.

8 Claims, 3 Drawing Sheets

ON-BOARD COMMUNICATION SYSTEM AND METHOD FOR CONTROLLING ON-BOARD COMMUNICATION SYSTEM

CROSS-REFERENCE TO RELATED APPLICATION

The present application claims priority to Japanese Patent Application No. 2016-251970 filed Dec. 26, 2016, which is incorporated herein by reference in its entirety.

BACKGROUND

The present invention relates to an on-board communication system that transmits communication data from a plurality of on-board devices to an external device through an on-board communication device and a method for controlling the on-board communication system.

U.S. Pat. No. 7,319,848 describes an example of an on-board communication system that includes a plurality of subsystems corresponding to multiple functions of the vehicle. The subsystems are connected to each other by a common communication bus. The on-board communication system further includes a communication subsystem having a communication function. The communication subsystem transmits communication data from other subsystems to a server located outside the vehicle. In this case, the communication subsystem associates communication data with the vehicle identification number (VIN), which uniquely identifies the vehicle, for example, the manufacturer, model, and manufactured year of the vehicle, and transmits the communication data, associated with the vehicle identification number, to the server. This allows the server to manage multiple pieces of communication data in a manner separated for each vehicle, which serves as a transmitter, based on the vehicle identification number associated with each piece of communication data regardless of the type of communication data.

The above system arbitrates simultaneous transmissions of communication data from the multiple subsystems to the communication subsystem based on a communication protocol that specifies transmission and reception of communication data through the communication bus. However, if limitations are imposed on the communication speed of the communication bus, the communication speed of the communication subsystem is also decreased.

SUMMARY

It is an object of the present invention to provide an on-board communication system that improves the communication speed for transmitting communication data of a plurality of on-board devices from an on-board communication device. It is also an object of the present invention to provide a method for controlling the on-board communication system.

To achieve the above object, an on-board communication system is configured to perform data communication with a server located outside a vehicle. The on-board communication system includes an on-board communication device, a plurality of on-board devices configured to perform data communication with the server via the on-board communication device, a first communication line connecting each of the plurality of on-board devices and another one of the plurality of on-board devices separately from the rest of the plurality of on-board devices, and at least one second communication line connecting one of the plurality of on-board devices and the on-board communication device separately from the rest of the plurality of on-board devices. Each of the plurality of on-board devices includes a communication device controller configured to control data communication performed between the on-board communication device and the server and a priority setting portion configured to set priority ranks of the plurality of on-board devices for controlling the on-board communication device. The plurality of on-board devices includes at least one first on-board device, which is connected to the on-board communication device by at least the first communication line, the second communication line, and another one of the plurality of on-board devices, and at least one second on-board device, which is connected to the on-board communication device by the second communication line without any one of the plurality of on-board devices connected between the at least one second on-board device and the on-board communication device. When each of the plurality of on-board devices performs data communication with the server and if any one of the plurality of on-board devices is set to a higher priority rank, the on-board device is configured to transmit communication data to the on-board device that is set to a higher priority rank to perform data communication with the server via the on-board device that is set to a higher priority rank and the on-board communication device.

To achieve the above object, in a method for controlling an on-board communication system configured to perform data communication with a server located outside a vehicle, the on-board communication system includes an on-board communication device, a plurality of on-board devices configured to perform data communication with the server via the on-board communication device, a first communication line connecting each of the plurality of on-board devices and another one of the plurality of on-board devices separately from the rest of the plurality of on-board devices, and at least one second communication line connecting one of the plurality of on-board devices and the on-board communication device separately from the rest of the plurality of on-board devices. The plurality of on-board devices includes at least one first on-board device, which is connected to the on-board communication device by at least the first communication line, the second communication line, and another one of the plurality of on-board devices, and at least one second on-board device, which is connected to the on-board communication device by the second communication line without any one of the plurality of on-board devices connected between the at least one second on-board device and the on-board communication device. The method includes having each of the plurality of on-board devices set priority ranks of the plurality of on-board devices for controlling the on-board communication device and having, when each of the plurality of on-board devices performs data communication with the server and if any one of the plurality of on-board devices is set to a higher priority rank, the on-board device transmit communication data to the on-board device that is set to a higher priority rank to perform data communication with the server via the on-board device that is set to a higher priority rank and the on-board communication device.

To achieve the above object, an on-board communication system is configured to perform data communication with a server located outside a vehicle. The on-board communication system includes an on-board communication device, a plurality of on-board devices configured to perform data communication with the server via the on-board communication device, a first communication line connecting each of the plurality of on-board devices and another one of the plurality of on-board devices separately from the rest of the plurality of on-board devices, and at least one second communication line connecting one of the plurality of on-board devices and the on-board communication device separately from the rest of the plurality of on-board devices. The plurality of on-board devices includes at least one first on-board device, which is connected to the on-board communication device by at least the first communication line, the second communication line, and another one of the plurality of on-board devices, and at least one second on-board device, which is connected to the on-board communication device by the second communication line without any one of the plurality of on-board devices connected between the at least one second on-board device and the on-board communication device. Each of the plurality of on-board devices includes circuitry. The circuitry is configured to set priority ranks of the plurality of on-board devices for controlling the on-board communication device. When the circuitry performs data communication with the server and if any one of the plurality of on-board devices is set to a higher priority rank, the circuitry is configured to transmit communication data to the on-board device that is set to a higher priority rank to perform data communication with the server via the on-board device that is set to a higher priority rank and the on-board communication device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

One embodiment of an on-board communication system will now be described with reference to the drawings.

The on-board communication system of the present embodiment includes a plurality of electronic control units (ECUs), functioning as on-board devices, and an on-board communication device. The ECUs perform data communication via the on-board communication device with a center that manages travel information of a plurality of vehicles. The ECUs may be configured as circuitry including 1) one or more processors that operate in accordance with computer programs (software), 2) one or more dedicated hardware circuits such as ASICs, or 3) the combination of these. Each processor includes a CPU and memories such as a RAM and a ROM. The memories store program codes or instructions configured for the CPU to execute processes. The memories, or computer readable media, include any applicable medium that is accessible with a versatile or dedicated computer.

Figure 1:
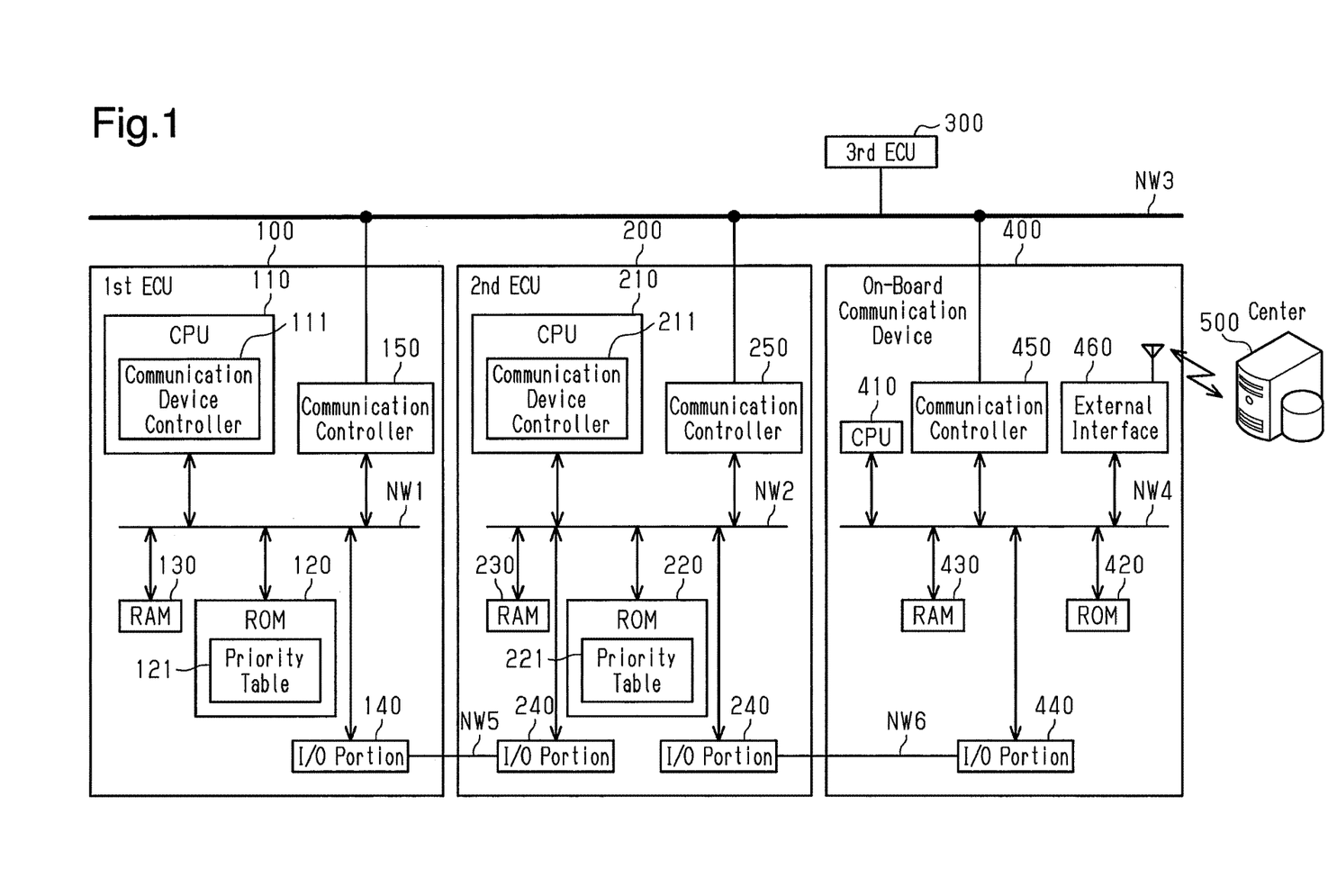
FIG. 1 is a block diagram showing the schematic structure of one embodiment of an on-board communication system.

More specifically, as shown in FIG. 1, a first ECU 100 and a second ECU 200 respectively include, for example, central processing units 110, 210 (CPUs), read-only memories 120, 220 (ROMs), random access memories 130, 230 (RAMs), I/O portions 140, 240 (input-output port portions), and communication controllers 150, 250 that are mutually connected by communication buses NW1, NW2. The communication controller 150 of the first ECU 100 and the communication controller 250 of the second ECU 200 are connected to each other by a vehicle network NW3 (communication line). Further, a third ECU 300 is connected to the vehicle network NW3 in addition to the first ECU 100 and the second ECU 200. Examples of the ECUs 100, 200, 300 include a drive system ECU that controls, for example, an engine, a brake device, or a steering device, a body system ECU that controls, for example, an air-conditioning device or a meter displaying various vehicle states, and an information system ECU that controls, for example, an automotive navigation system that performs a route guide from the current position to the destination. Each of the ECUs 100, 200, 300 transmits and receives communication data such as various kinds of sensor data and control data through the vehicle network NW3. In the present embodiment, the vehicle network NW3 transmits and receives the communication data in accordance with a communication protocol specified in a controller area network (CAN).

The first ECU 100, the second ECU 200, and the third ECU 300 are also connected to an on-board communication device 400 by the vehicle network NW3. That is, the vehicle network NW3 mutually connects three or more on-board devices, including the first, second, and third ECUs 100, 200, 300, to the on-board communication device 400. The on-board communication device 400 includes, for example, a CPU 410, a ROM 420, a RAM 430, an I/O portion 440, a communication controller 450, and an external interface 460 that are mutually connected by a communication bus NW4.

Additionally, a dedicated communication line NW5, which is a communication path differing from the vehicle network NW3 described above, is provided between the I/O portion 140 of the first ECU 100 and the I/O portion 240 of the second ECU 200 to connect the ECUs 100, 200 to each other separately from other devices, that is, independently from other devices. In the same manner, a dedicated communication line NW6, which is a communication path differing from the vehicle network NW3 described above, is provided between the I/O portion 240 of the second ECU 200 and the I/O portion 440 of the on-board communication device 400 to connect the second ECU 200 and the on-board communication device 400 to each other separately from other devices, that is, independently from other devices. For example, a USB communication cable, a PCI-E bus, or a serial connection line may be used as the communication lines NW5, NW6. The communication speed of the dedicated communication lines NW5, NW6, which connect the ECUs 100, 200 to each other or the second ECU 200 and the on-board communication device 400, tends to be higher than the communication speed of the vehicle network NW3, which connects the three or more on-board devices to each other.

Thus, in the present embodiment, the first ECU 100 and the second ECU 200 transmit communication data that they manage to the on-board communication device 400 through the communication lines NW5, NW6. The on-board communication device 400 transmits the communication data, which is transferred from each of the ECUs 100, 200, through the external interface 460 to a center 500 located outside the vehicle.

Generally, the vehicle network NW3 mutually connects three or more on-board devices. Thus, even when multiple ECUs simultaneously request the on-board communication device 400 through the vehicle network NW3 to transmit communication data, these requests are arbitrated in accordance with the communication protocol. On the other hand, each of the communication lines NW5, NW6 connects two on-board devices on a one-to-one basis so that the two on-board devices perform data communication with each other as one of the two on-board devices serves as the main subject. Thus, the communication protocol may not expect that multiple ECUs simultaneously request the on-board communication device 400 through the communication lines NW5, NW6 to transmit communication data.

In the present embodiment, the CPU 110 of the first ECU 100 and the CPU 210 of the second ECU 200 respectively function as communication device controllers 111, 211, which control data communication performed with the center 500 located outside the vehicle via the on-board communication device 400. The ROM 120 of the first ECU 100 and the ROM 220 of the second ECU 200 respectively include priority tables 121, 221, which function as priority setting portions that set priority ranks of the ECUs 100, 200. Before the first ECU 100 and the second ECU 200 transmit communication data through the on-board communication device 400, the communication device controllers 111, 211 refer to the priority tables 121, 221. For example, when the second ECU 200 has a higher priority rank than the first ECU 100, the first ECU 100 transmits communication data to the second ECU 200 to perform data communication with the center 500 through the second ECU 200 and the on-board communication device 400. Also, for example, when the second ECU 200 has a higher priority rank than the first ECU 100, the second ECU 200 transmits communication data to the on-board communication device 400 to perform data communication with the center 500 via the on-board communication device 400.

Figure 2:
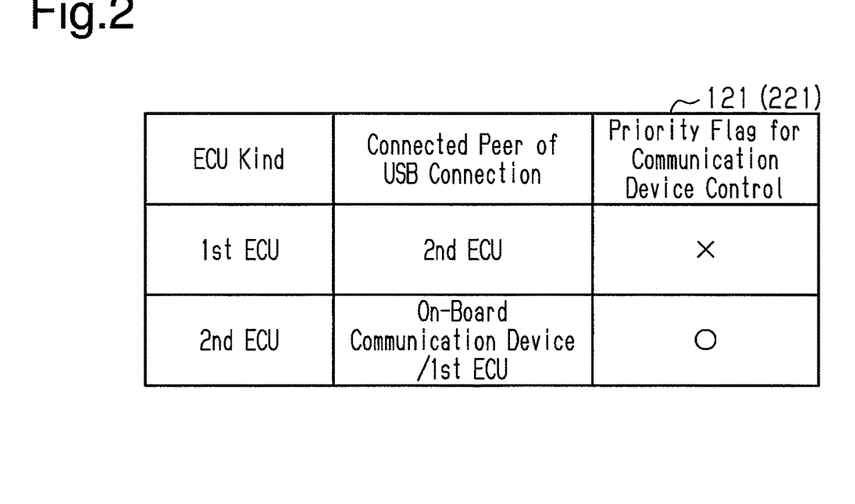
FIG. 2 is a schematic chart showing one example of contents set in a priority table.

FIG. 2 shows one example of data contents set in the priority tables 121, 221. The priority tables 121, 221 of FIG. 2 show that the connected peer of the first ECU 100 is only the second ECU 200 via the communication line NW5 and that the connected peers of the second ECU 200 are the first ECU 100 and the on-board communication device 400 via the communication lines NW5, NW6, respectively. More specifically, the communication line NW5 connects the first ECU 100 and the second ECU 200, and the communication line NW6 connects the second ECU 200 and the on-board communication device 400. Thus, the first ECU 100 is indirectly connected to the on-board communication device 400 by the second ECU 200. The communication line NW6 connects the second ECU 200 and the on-board communication device 400 so that the second ECU 200 is directly connected to the on-board communication device 400 without other ECUs connected between the second ECU 200 and the on-board communication device 400. In the present embodiment, a priority flag for controlling the communication device is set on the second ECU 200, which is directly connected to the on-board communication device 400 by the communication line NW6, so that the second ECU 200 is set to a higher priority rank than the first ECU 100.

Thus, the first ECU 100 transmits communication data to the second ECU 200, which has a higher priority rank, to perform data communication with the center 500 via the second ECU 200 and the on-board communication device 400. The second ECU 200 performs data communication with the center 500 via the on-board communication device 400 without transmitting communication data to another ECU. More specifically, the second ECU 200, which has a higher priority rank than the first ECU 100, transmits communication data managed by the first ECU 100, which has a lower priority rank, to the on-board communication device 400 through the communication line NW6 in addition to communication data managed by it. Then, the on-board communication device 400 transmits the communication data, which is received from the second ECU 200 as described above, to the center 500 located outside the vehicle through the external interface 460.

The operation of the on-board communication system of the present embodiment will now be described particularly focusing on the operation when each of the ECUs 100, 200, 300 transmits communication data to the center 500 through the on-board communication device 400.

Figure 3:
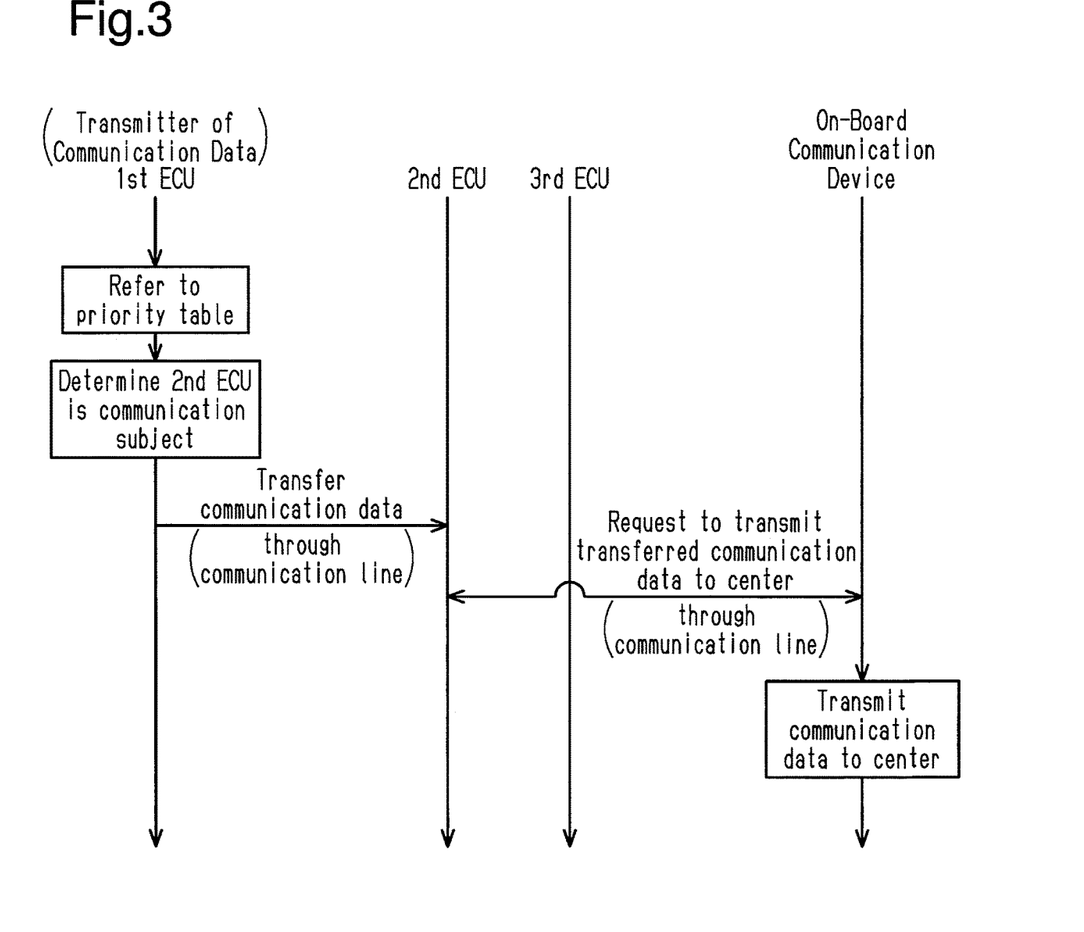
FIG. 3 is a sequence chart showing a flow of information when the on-board communication system of FIG. 1 transmits communication data through the on-board communication device.

As shown in FIG. 3, when the first ECU 100 is the transmitter of communication data, the first ECU 100 first refers to the priority table 121 to determine an ECU having a higher priority rank, that is, an ECU that is given priority for using the on-board communication device 400. In the present embodiment, as shown in FIG. 2, the second ECU 200 is set to a higher priority rank than the first ECU 100. Thus, the first ECU 100 determines that the second ECU 200 is the ECU that is given priority for using the on-board communication device 400. The first ECU 100 transfers communication data that it manages to the second ECU 200 through the communication line NW5.

Then, the second ECU 200 transmits a request to the on-board communication device 400 through the communication line NW6 for transmission of the communication data transferred from the first ECU 100 to the center 500. Based on the request from the second ECU 200, the on-board communication device 400 transmits the communication data, which is transferred from the first ECU 100, to the center 500.

Figure 4:
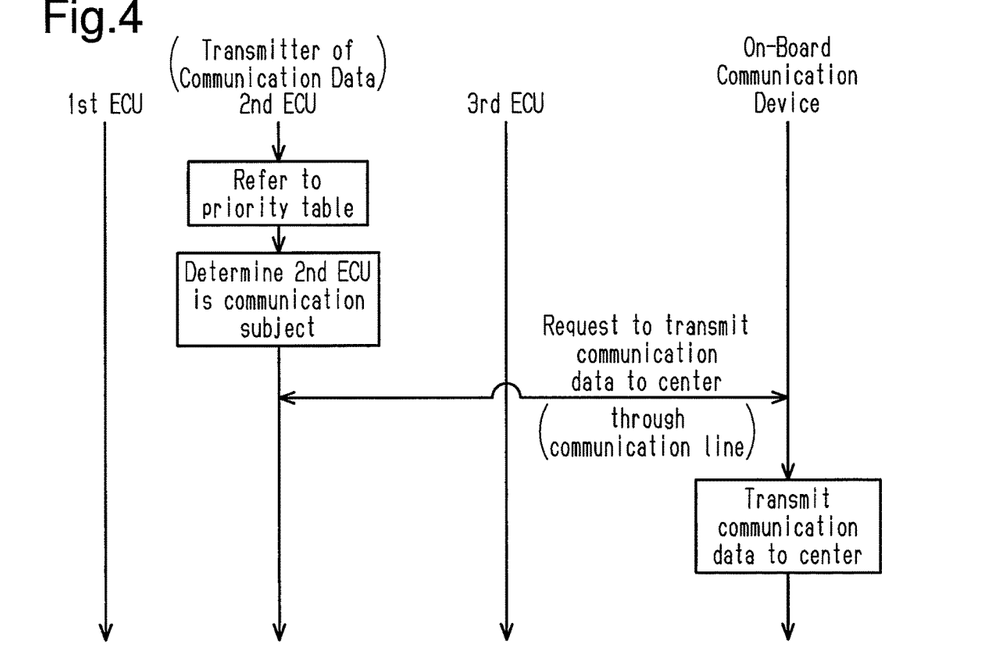
FIG. 4 is a sequence chart showing a flow of information when the on-board communication system of FIG. 1 transmits communication data through the on-board communication device.

As shown in FIG. 4, when the second ECU 200 is the transmitter of communication data, the second ECU 200 first refers to the priority table 221 to determine an ECU having a higher priority rank, that is, an ECU that is given priority for using the on-board communication device 400. As described above, in the present embodiment, the second ECU 200 is set to a higher priority rank than the first ECU 100. Thus, the second ECU 200 determines that the second ECU 200 is the ECU that is given priority for using the on-board communication device 400.

The second ECU 200 transmits a request to the on-board communication device 400 through the communication line NW6 for transmission of communication data that it manages to the center 500. Based on the request from the second ECU 200, the on-board communication device 400 transmits communication data, which is transferred from the second ECU 200, to the center 500.

Figure 5:
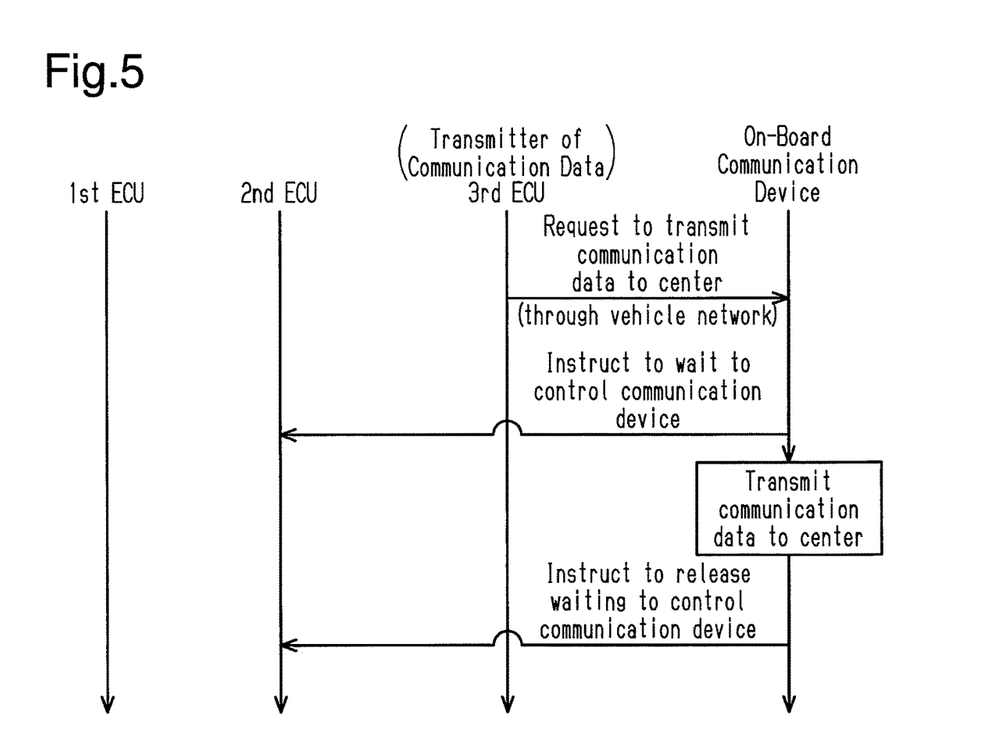
FIG. 5 is a sequence chart showing a flow of information when the on-board communication system of FIG. 1 transmits communication data through the on-board communication device.

As shown in FIG. 5, when the third ECU 300 is the transmitter of communication data, the third ECU 300 first transmits a request to the on-board communication device 400 through the vehicle network NW3 for transmission of communication data that it manages to the center 500.

When the on-board communication device 400 receives the request from the third ECU 300 through the vehicle network NW3 for transmitting communication data, the on-board communication device 400 instructs the second ECU 200, which is directly connected to the on-board communication device 400 by the communication line NW6, to wait to control the transmission of communication data through the on-board communication device 400. Consequently, if the second ECU 200 is transmitting communication data that it manages or communication data that is transferred from the first ECU 100 through the on-board communication device 400, the operation for transmitting the communication data is interrupted. If the second ECU 200 has not transmitted communication data that it manages or communication data that is transferred from the first ECU 100 through the on-board communication device 400, the second ECU 200 will not start the operation for transmitting the communication data and waits.

Subsequently, when the on-board communication device 400 completes the transmission of communication data, which is transferred from the third ECU 300, to the center 500, the on-board communication device 400 instructs the second ECU 200 to be released from the waiting to control the transmission of communication data through the on-board communication device 400. The second ECU 200 resumes the operation for transmitting the communication data that it manages or the data transferred from the first ECU 100 through the on-board communication device 400.

The effects of the on-board communication system of the present embodiment will now be described.

When ECUs are installed in a vehicle and transmit communication data through an on-board communication device, the communication speed of the data is often limited by the communication speed of the vehicle network NW3. In this regard, as compared to the vehicle network NW3 described above, the dedicated communication line NW5, which connects the ECUs 100, 200 to each other separately from other devices, that is, independently from other devices, and the dedicated communication line NW6, which connects the second ECU 200 and the on-board communication device 400 to each other separately from other devices, that is, independently from other devices, easily ensure the communication speed of data. However, unlike the vehicle network NW3, in which three or more ECUs mutually perform data communication via the common network, the communication protocol may not specify the arbitration procedures when multiple ECUs simultaneously request the on-board communication device 400 through the dedicated communication lines NW5, NW6 to transmit communication data.

In this regard, in the present embodiment, among multiple ECUs directly or indirectly connected to the on-board communication device 400 by the communication lines NW5, NW6, when a predetermined ECU transmits communication data through the on-board communication device 400, the predetermined ECU refers to the priority tables 121, 221 to determine the priority ranks of the ECUs 100, 200. If any one of the ECUs has a higher priority rank, the predetermined ECU transmits the communication data to the ECU having a higher priority rank to perform data communication with the center 500 via the ECU having the higher priority rank and the on-board communication device 400. The ECUs, which are directly or indirectly connected to the on-board communication device 400 by the communication lines NW5, NW6, arbitrate the subject that controls the on-board communication device 400. Consequently, the communication speed is increased by performing data communication between the plurality of ECUs and the on-board communication device 400 via the communication lines NW5, NW6. Additionally, the common on-board communication device 400 may be used to perform data communication with the center 500.

In the present embodiment, regardless of the network configuration of ECUs with respect to the on-board communication device 400, the ECUs, which are directly or indirectly connected to the on-board communication device 400 by the communication lines NW5, NW6, can determine the subject that controls the on-board communication device 400 with reference to the priority tables 121, 221. Thus, the ECUs may have the same configuration among different types of vehicles having different network configurations of ECUs with respect to the on-board communication device 400.

Particularly, in the present embodiment, when the on-board communication device 400 receives a request through the vehicle network NW3 from the third ECU 300, which is not connected to the on-board communication device 400 by the communication lines NW5, NW6, for transmission of communication data, the on-board communication device 400 instructs the second ECU 200, which is directly connected to the on-board communication device 400 by the communication line NW6, to wait to control the transmission of communication data through the on-board communication device 400. The second ECU 200, which is directly connected to the on-board communication device 400 by the communication line NW6, corresponds to an ECU that coordinates pieces of communication data managed by each of the ECUs directly or indirectly connected to the on-board communication device 400 by the communication lines NW5, NW6 and transmits the pieces of communication data to the on-board communication device 400. Thus, even when requests for transmission of communication data are simultaneously made to the on-board communication device 400 through the vehicle network NW3 and the communication lines NW5, NW6, which are communication paths differing from each other, a piece of communication data that is subject to transmission to the on-board communication device 400 is selected from the communication data. More specifically, the arbitration related to the subject that controls the on-board communication device 400 is performed not only between the ECUs 100, 200, which are connected to the on-board communication device 400 by the communication lines NW5, NW6, but also among the first ECU 100, the second ECU 200, and the third ECU 300.

As described above, the embodiment has the advantages described below.

(1) When the multiple ECUs 100, 200 are connected to the on-board communication device 400 by the communication lines NW5, NW6, the communication device controllers 111, 211 of the ECUs 100, 200 arbitrate the subject that controls the on-board communication device 400 between the ECUs 100, 200. Therefore, while the communication speed is increased by performing data communication between the ECUs 100, 200 and the on-board communication device 400 via the communication lines NW5, NW6, the common on-board communication device 400 may be used to perform data communication with the center 500. Such an arbitration of the subject controlling the on-board communication device 400 does not depend on the network configuration of the ECUs 100, 200 with respect to the on-board communication device 400. Thus, the ECUs 100, 200 may have the same configuration among different types of vehicles having different network configurations of the ECUs 100, 200 with respect to the on-board communication device 400.

(2) The second ECU 200, which is directly connected to the on-board communication device 400 by the communication line NW6, transmits communication data, which is transmitted from the first ECU 100, to the on-board communication device 400 through the communication line NW6. Thus, as compared to a configuration in which one ECU coordinates communication data and transmits the communication data to the on-board communication device 400 through another ECU, the communication data of the ECUs 100, 200 is efficiently transmitted to the on-board communication device 400. This further improves the communication speed of data communication performed with the center 500 located outside the vehicle via the on-board communication device 400.

(3) When the on-board communication device 400 receives a request through the vehicle network NW3 from the third ECU 300, which is not connected to the on-board communication device 400 by the communication lines NW5, NW6, for transmission of communication data to the center 500, the on-board communication device 400 instructs the second ECU 200, which is directly connected to the on-board communication device 400 by the communication line NW6, to wait to control the communication device. Thus, the arbitration related to the subject controlling the on-board communication device 400 may be performed between the ECUs 100, 200, which are connected to the on-board communication device 400 by the communication lines NW5, NW6, and also among the first ECU 100, the second ECU 200, and the third ECU 300.

The above embodiment may be modified as follows.

In the above embodiment, the priority ranks of the ECUs 100, 200 for controlling the on-board communication device 400 are set based on the distances from each of the ECUs 100, 200 to the on-board communication device 400 via the communication lines NW5, NW6 on the network. However, the reference for determining the priority ranks for controlling the on-board communication device 400 may be elements other than the distances on the network from each of the ECUs 100, 200 to the on-board communication device 400 via the communication lines NW5, NW6, for example, the processability of the CPUs mounted on the ECUs. In this case, among multiple ECUs directly or indirectly connected to the on-board communication device 400 by the communication lines NW5, NW6, one of the ECUs directly connected to the on-board communication device 400 by the communication line NW6 is not necessarily set to a higher priority rank. Thus, in the same manner as the first ECU 100 and the second ECU 200, it is preferred that the on-board communication device 400 include a priority table that sets the priority ranks of the ECUs 100, 200 for controlling the on-board communication device 400. With this configuration, when the on-board communication device 400 receives a request through the vehicle network NW3 from the third ECU 300, which is not connected by the communication lines NW5, NW6, for transmission of communication data to the center 500, the on-board communication device 400 is capable of instructing the ECU serving as the subject that controls the on-board communication device 400 to wait to control the communication device with reference to its priority table.

In the above embodiment, when the on-board communication device 400 receives a request through the vehicle network NW3 from the third ECU 300, which is not connected to the on-board communication device 400 by the communication lines NW5, NW6, for transmission of communication data to the center 500, the on-board communication device 400 instructs the second ECU 200, which is directly connected to the on-board communication device 400 by the communication line NW6, to wait to control the communication device. Instead, when the on-board communication device 400 receives a request through the vehicle network NW3 from the third ECU 300 for transmission of communication data to the center 500, the on-board communication device 400 may determine whether or not the second ECU 200 has requested transmission of communication data through the communication line NW6. Only when the request has not been made, the on-board communication device 400 may transmit communication data of the third ECU 300 to the center 500. More specifically, when the on-board communication device 400 simultaneously receives requests from the ECUs 100, 200 and the third ECU 300 for transmission of communication data, the on-board communication device 400 may give priority to transmission of communication data received from the ECUs 100, 200 to the center 500.

The above embodiment is described as an example in which only one ECU 200 (communication line NW6) is configured to be directly connected to the on-board communication device 400. Instead, multiple ECUs (communication lines) may be configured to be directly connected to the on-board communication device 400. Also, with this configuration, the common on-board communication device 400 may be used to perform data communication with the center 500 through the communication lines as long as, as described above, the priority ranks of the ECUs directly connected to the on-board communication device 400 by the communication lines are set in advance based on the distances on the network between each ECU and the on-board communication device 400 via the communication line or other determination references.

The above embodiment is described as an example in which the multiple ECUs are configured to be connected in series with the on-board communication device 400 by the communication lines NW5, NW6. Instead, the network configuration of ECUs connected to the on-board communication device 400 by the communication lines NW5, NW6 may be parallel connection in which multiple ECUs are connected to a predetermined ECU by communication lines or the combination of series connection and parallel connection. More specifically, even when ECUs have different network configurations with respect to the on-board communication device 400, the common on-board communication device 400 may be used to perform data communication with the center 500 via communication lines as long as the priority ranks of the ECUs are set for controlling the on-board communication device.

Therefore, the present examples and embodiments are to be considered as illustrative and not restrictive and the invention is not to be limited to the details given herein, but may be modified within the scope and equivalence of the appended claims.

The invention claimed is:

1. An on-board communication system configured to perform data communication with a server located outside a vehicle, the on-board communication system comprising:
   an on-board communication device;
   a plurality of on-board devices configured to perform data communication with the server via the on-board communication device;
   a first communication line connecting each of the plurality of on-board devices and another one of the plurality of on-board devices separately from the rest of the plurality of on-board devices; and at least one second communication line connecting one of the plurality of on-board devices and the on-board communication device separately from the rest of the plurality of on-board devices, wherein each of the plurality of on-board devices includes
a communication device controller configured to control data communication performed between the on-board communication device and the server, and
a priority setting portion configured to set priority ranks of the plurality of on-board devices for controlling the on-board communication device, the plurality of on-board devices includes at least one first on-board device, which is connected to the on-board communication device by at least the first communication line, the second communication line, and another one of the plurality of on-board devices, and at least one second on-board device, which is connected to the on-board communication device by the second communication line without any one of the plurality of on-board devices connected between the at least one second on-board device and the on-board communication device, and when each of the plurality of on-board devices performs data communication with the server and if one of the plurality of on-board devices is set to a higher priority rank than the rest of the plurality of on-board devices, communication data managed by the one of the plurality of on-board devices and the rest of the plurality of on-board devices is transmitted to the one of the plurality of on-board devices and data communication with the server is performed by the on-board communication device through the one of the plurality of on-board devices, wherein the on-board communication system further comprises at least one third on-board device that is not connected to the on-board communication device by the first communication line and the second communication line but connected to the on-board communication device by a third communication line, which differs from the first communication line and the second communication line, and wherein the on-board communication system further comprises at least one third on-board device that is not connected to the on-board communication device by the first communication line and the second communication line but directly connected to the on-board communication device by a third communication line, which differs from the first communication line and the second communication line.

2. The on-board communication system according to claim 1, wherein the priority setting portion of each of the plurality of on-board devices is configured to set the second on-board device to a higher priority rank than the first on-board device.

3. The on-board communication system according to claim 1,
wherein when the on-board communication device receives a request from the third on-board device for transmission of communication data to the server, the on-board communication device is configured to instruct one of the first on-board device and the second on-board device that is set to a higher priority rank to wait to control the on-board communication device so that priority is given to the transmission of communication data from the third on-board device.

4. The on-board communication system according to claim 1, wherein the at least one first on-board device and the at least one second on-board device are directly connected to the third communication line.

5. A method for controlling an on-board communication system configured to perform data communication with a server located outside a vehicle, wherein the on-board communication system includes
an on-board communication device,
a plurality of on-board devices configured to perform data communication with the server via the on-board communication device,
a first communication line connecting each of the plurality of on-board devices and another one of the plurality of on-board devices separately from the rest of the plurality of on-board devices, and
at least one second communication line connecting one of the plurality of on-board devices and the on-board communication device separately from the rest of the plurality of on-board devices,
wherein the plurality of on-board devices includes at least one first on-board device, which is connected to the on-board communication device by at least the first communication line, the second communication line, and another one of the plurality of on-board devices, and at least one second on-board device, which is connected to the on-board communication device by the second communication line without any one of the plurality of on-board devices connected between the at least one second on-board device and the on-board communication device, the method comprising:
having each of the plurality of on-board devices set priority ranks of the plurality of on-board devices for controlling the on-board communication device; and
having, when each of the plurality of on-board devices performs data communication with the server and if one of the plurality of on-board devices is set to a higher priority rank than the rest of the plurality of on-board devices, communication data managed by the one of the plurality of on-board devices and the rest of the plurality of on-board devices transmitted to the one of the plurality of on-board devices, and performing data communication with the server by the on-board communication device through the one of the plurality of on-board devices,
wherein the on-board communication system further includes at least one third on-board device that is not connected to the on-board communication device by the first communication line and the second communication line but connected to the on-board communication device by a third communication line, which differs from the first communication line and the second communication line, and
wherein the on-board communication system further comprises at least one third on-board device that is not connected to the on-board communication device by the first communication line and the second communication line but directly connected to the on-board communication device by a third communication line, which differs from the first communication line and the second communication line.

6. The method for controlling an on-board communication system according to claim 5, wherein the at least one first on-board device and the at least one second on-board device are directly connected to the third communication line.

7. An on-board communication system configured to perform data communication with a server located outside a vehicle, the on-board communication system comprising:
an on-board communication device;
a plurality of on-board devices configured to perform data communication with the server via the on-board communication device;
a first communication line connecting each of the plurality of on-board devices and another one of the plurality of on-board devices separately from the rest of the plurality of on-board devices; and
at least one second communication line connecting one of the plurality of on-board devices and the on-board communication device separately from the rest of the plurality of on-board devices, wherein
the plurality of on-board devices includes at least one first on-board device, which is connected to the on-board communication device by at least the first communication line, the second communication line, and another one of the plurality of on-board devices, and at least one second on-board device, which is connected to the on-board communication device by the second communication line without any one of the plurality of on-board devices connected between the at least one second on-board device and the on-board communication device,
each of the plurality of on-board devices includes circuitry,
the circuitry is configured to set priority ranks of the plurality of on-board devices for controlling the on-board communication device, and
when the circuitry performs data communication with the server and if one of the plurality of on-board devices is set to a higher priority rank than the rest of the plurality of on-board devices, the circuitry is configured to transmit communication data managed by the one of the plurality of on-board devices and the rest of the plurality of on-board devices to the one of the plurality of on-board devices and to perform data communication with the server by the on-board communication device through the one of the plurality of on-board devices,
wherein the on-board communication system further includes at least one third on-board device that is not connected to the on-board communication device by the first communication line and the second communication line but connected to the on-board communication device by a third communication line, which differs from the first communication line and the second communication line, and
wherein the on-board communication system further comprises at least one third on-board device that is not connected to the on-board communication device by the first communication line and the second communication line but directly connected to the on-board communication device by a third communication line, which differs from the first communication line and the second communication line.

8. The on-board communication system according to claim 7, wherein the at least one first on-board device and the at least one second on-board device are directly connected to the third communication line.

* * * * *